(12) United States Patent
Nitta et al.

(10) Patent No.: US 6,787,936 B2
(45) Date of Patent: Sep. 7, 2004

(54) SEMICONDUCTOR INTEGRATED CIRCUIT

(75) Inventors: Yasuhiko Nitta, Tokyo (JP); Hiroki Takahashi, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 199 days.

(21) Appl. No.: 09/968,509

(22) Filed: Oct. 2, 2001

(65) Prior Publication Data

US 2002/0171295 A1 Nov. 21, 2002

(30) Foreign Application Priority Data

May 21, 2001 (JP) ........................................ 2001-151052

(51) Int. Cl.$^7$ ................................................ H02J 7/00
(52) U.S. Cl. ............................ 307/64; 307/66; 307/140
(58) Field of Search ............................. 307/64, 66, 140

(56) References Cited

U.S. PATENT DOCUMENTS

| | | | | |
|---|---|---|---|---|
| 4,795,914 A | * | 1/1989 | Higa et al. ..................... | 307/64 |
| 5,307,318 A | * | 4/1994 | Nemoto ....................... | 365/226 |
| 5,703,412 A | * | 12/1997 | Takemoto et al. ......... | 307/10.1 |
| 6,404,081 B1 | * | 6/2002 | Staffiere ..................... | 307/130 |

FOREIGN PATENT DOCUMENTS

| | | |
|---|---|---|
| JP | 58-127225 | 7/1983 |
| JP | 4-127290 | 4/1992 |
| JP | 4-335413 | 11/1992 |
| JP | 2000-267769 | 9/2000 |

* cited by examiner

*Primary Examiner*—Robert DeBeradinis
(74) *Attorney, Agent, or Firm*—Leydig, Voit & Mayer, Ltd.

(57) ABSTRACT

A semiconductor integrated circuit includes two power supply lines and at least one electronic circuit connected to each of the power supply lines. One of the two power supply lines is connected with an externally located main power source, and the other power supply line is connected with an externally located backup power source. A switch electrically connects or disconnects the power supply lines with each other. A power supervisory circuit monitors voltage of the main power source and controls the switch. The switch is controlled so that power from the main power source is supplied to the electronic circuits when the main power source is operating normally, and power from the backup power source is supplied to the electronic circuits when the main power source has a failure.

17 Claims, 5 Drawing Sheets

SEMICONDUCTOR INTEGRATED CIRCUIT

FIELD OF THE INVENTION

The present invention relates to a semiconductor integrated circuit in which components such as a CPU, memory, clock generator circuit, and timer circuit are integrated on one silicon substrate, and a backup battery is provided outside this silicon substrate.

BACKGROUND OF THE INVENTION

Japanese Patent Application Laid-Open No. 4-127290 has disclosed the conventional art relative to a semiconductor integrated circuit having a backup battery provided outside a silicon substrate. FIG. 4 shows the disclosed semiconductor integrated circuit. This conventional art shows an example of a non-contact IC card. This non-contact IC card transmits and receives signals to and from an external device in the form of electromagnetic waves. The IC card 100 includes the CPU 101 that controls entire operation of the IC card 100. The CPU 101 is connected with the ROM 102 and RAM 103 via the bus 99. Moreover, the bus 99 is connected with the input/output control circuit 104 that controls input/output to an external device. The input-output control circuit 104 is connected with the antenna 107 via the modulating/demodulating circuit 106. The battery 108 supplies power to the CPU 101, ROM 102, RAM 103, input/output control circuit 104, modulating/demodulating circuit 106, and the antenna 107.

FIG. 5 shows an internal configuration of the battery 108. The battery 108 comprises the constant voltage source 109, power supervisory circuit 110, diode 114 for rectification, and the capacitor 115. The constant voltage source 109 generates a voltage VDD, and the power supervisory circuit 110 supervises the magnitude VDD of the voltage, and controls opening and closing of the switches 111, 112 and 113. The capacitor 115 is operated as a backup voltage source.

The IC card 100 receives a request signal in the form of electromagnetic waves via the antenna 107 from the external device. When such a request signal is received, the request signal is input into the CPU 101 via the modulating/demodulating circuit 106. The CPU 101 decodes the request signal, and makes a predetermined answer signal based on program and data stored in the ROM 102 and the RAM 103. The answer signal is modulated by the modulating/demodulating circuit 106 via the input/output control circuit 104, and thereafter, is transmitted from the antenna 107 to the external device. When the above external output is performed, the CPU 101 rewrites the data stored in the RAM 103 in preparation for the next signal input from the external device. During a series of communication operation, the power supply voltage VDD is supplied from the battery 108 to these CPU 101, ROM 102, RAM 103, input/output control circuit 104, modulating/demodulating circuit 106 and antenna 107. At that time, in the battery 108, the switches 111 and 112 are connected individually to a terminal A side, and thereby, a constant voltage VDD generated by the constant voltage source 109 is supplied to the CPU 101 or the like. Further, at that time, the capacitor 115 is charged with a charge Q=C·VDD (C is capacity value).

In the above configuration, a power failure in the constant voltage source 109 causes unstable operation of various devices included in the IC card, such as CPU 101, ROM 102, and antenna 107. Under such a state, if the communication operation is continued, there is a possibility that the IC card will fall into an unpredictable operating state; more specifically, the program may run away, and stop midway in communication.

In order to avoid this situation, in the battery 108, a voltage level of the power supply voltage VDD is supervised by the power supervisory circuit 110. When detecting that the power supply voltage VDD has become lower than a predetermined voltage, the power supervisory circuit 110 informs the CPU 101 of the detection result, and simultaneously, changes the switches 111, 112 and 113 to a terminal B side. These switches 111, 112 and 113 are changed to the terminal B-side, and thereby, the power supply voltage is supplied from the capacitor 115 to the CPU 101, ROM 102, RAM 103, input/output control circuit 104, modulating/demodulating circuit 106 and antenna 107. Thereafter, various devices such as CPU 101 included in the IC card are operated by power from the capacitor 115; therefore, it is possible to shift the IC card 100 to a state of receiving no external request signal (=sleep mode state) after the current communication operation is completed. As described above, the battery 108 is provided with the backup capacitor 115, and thereby, even if the voltage of the constant voltage source 109 varies, it has no influence on the external device.

According to the conventional art, as described above, the backup capacitor 115 having a relatively large capacity has been connected to the power supply terminal. Therefore, even in the case where the power supply voltage of the constant voltage source 109 becomes lower than a predetermined voltage, it is possible to operate a micro-controller for a certain fixed time by using an electric energy stored in the backup capacitor 115.

However, according to the conventional art, a power supply interconnect line of the constant voltage source 109 and a power supply interconnect line of the backup capacitor 115 are connected in common to the micro-controller (CPU 101, ROM 102, RAM 103 or the like). Further, these common power supply interconnect lines are connected with electronic elements such as modulating/demodulating circuit 106, and antenna 107 except the micro-controller. Thus, according to the conventional art, in the backup, charge of the backup capacitor 115 is used for operating electronic elements, such as modulating/demodulating circuit 106, and antenna 107. For this reason, a problem arises such that micro-controller operable time becomes short. Further, according to the conventional art, in the micro-controller, the power supply interconnecting line is connected in common to all devices of the micro-controller. For this reason, when a voltage drop of the constant voltage source 109 is generated, even if the device to be actually operated is only one device (e.g., memory for storing data, timer circuit for counting time), all devices have been operated. As a result, a problem arises such that an operable time of various devices included in the micro-controller becomes short.

Further, according to the conventional art, the backup capacitor 115 charges a voltage of the constant voltage source 109 as it is; therefore, a charge Q stored in the backup capacitor 115 is the product of the power supply voltage VDD and the capacity value C of capacitor Q=Vcc·C. As a result, a problem arises such that a micro-controller operable time is limited by the capacity value C of the backup capacitor 115.

SUMMARY OF THE INVENTION

It is an object of the present invention to provide a semiconductor integrated circuit, which can operate a micro-controller for a long time when power failure such as instantaneous blackout is generated.

The semiconductor integrated circuit according to one aspect of the present invention comprises a micro-controller having at least two electronic circuits; a power supervisory circuit for supervising a power supply voltage of externally provided main power source and backup power source; a first power supply terminal connected to the main power source; a second power supply terminal connected to the backup power source; a first power supply line connecting a first electronic circuit of the micro-controller and the first power supply terminal; and a second power supply line connecting a second electronic circuit of the micro-controller and the second power supply terminal. The power supervisory circuit is supplied with main power from the main power source through and first power supply terminal, and supplied with backup power from the backup power source through the second power supply terminal. This power supervisory circuit includes a first switch connecting/disconnecting the first and second power supply terminals with each other; and a control circuit which monitors the main power source, and provides controls over the first and second switches. When the main power source is normal, the control circuit controls the first switch so that the first and second electronic circuits are driven by power from the main power source when the main power source is normal. When the main power source has a failure, the control circuit controls the first switch so that the second electronic circuit is driven by power from the backup power source when the main power source has a failure.

The semiconductor integrated circuit according to another aspect of the present invention comprises a micro-controller having at least two electronic circuits; a power supervisory circuit for supervising a power supply voltage of externally provided main power source and backup capacitor; a first power supply terminal connected to the main power source; a second power supply terminal connected to the backup capacitor; a first power supply line connecting a first electronic circuit of the micro-controller and the first power supply terminal; and a second power supply line connecting a second electronic circuit of the micro-controller and the second power supply terminal. The power supervisory circuit is supplied with main power from the main power source through and first power supply terminal, and supplied with backup power from the backup capacitor through the second power supply terminal. The power supervisory circuit includes a first switch that connects/disconnects the first and second power supply lines with each other; a second switch that connects the second power supply terminal to the first power supply terminal or the second power supply line; a third switch that connects/disconnects the first power supply terminal and the first power supply line with each other; and a control circuit which monitors the main power source, and provides controls over the first, second, and third switches. When the main power source is normal, the control circuit controls the first and third switches so that the first and second electronic circuits are driven by power from the main power source, and controls the second switch so that the second power supply terminal is connected to the first power supply terminal, thereby driving the first and second electronic circuits by power from the main power source. When the main power source has a failure, the control circuit controls the first switch so that the first and second power supply lines are connected with each other, controls the second switch so that the second power supply terminal is connected to the second power supply line side, and controls the third switch so that connection between the first power supply terminal and the first power supply line is not established, thereby driving the first and second electronic circuits by power from the backup capacitor.

Other objects and features of this invention will become apparent from the following description with reference to the accompanying drawings.

DESCRIPTION OF THE PREFERRED EMBODIMENTS

Embodiments of the semiconductor integrated circuit according to the present invention will be described in detail below with reference to the accompanying drawings.

Figure 1:
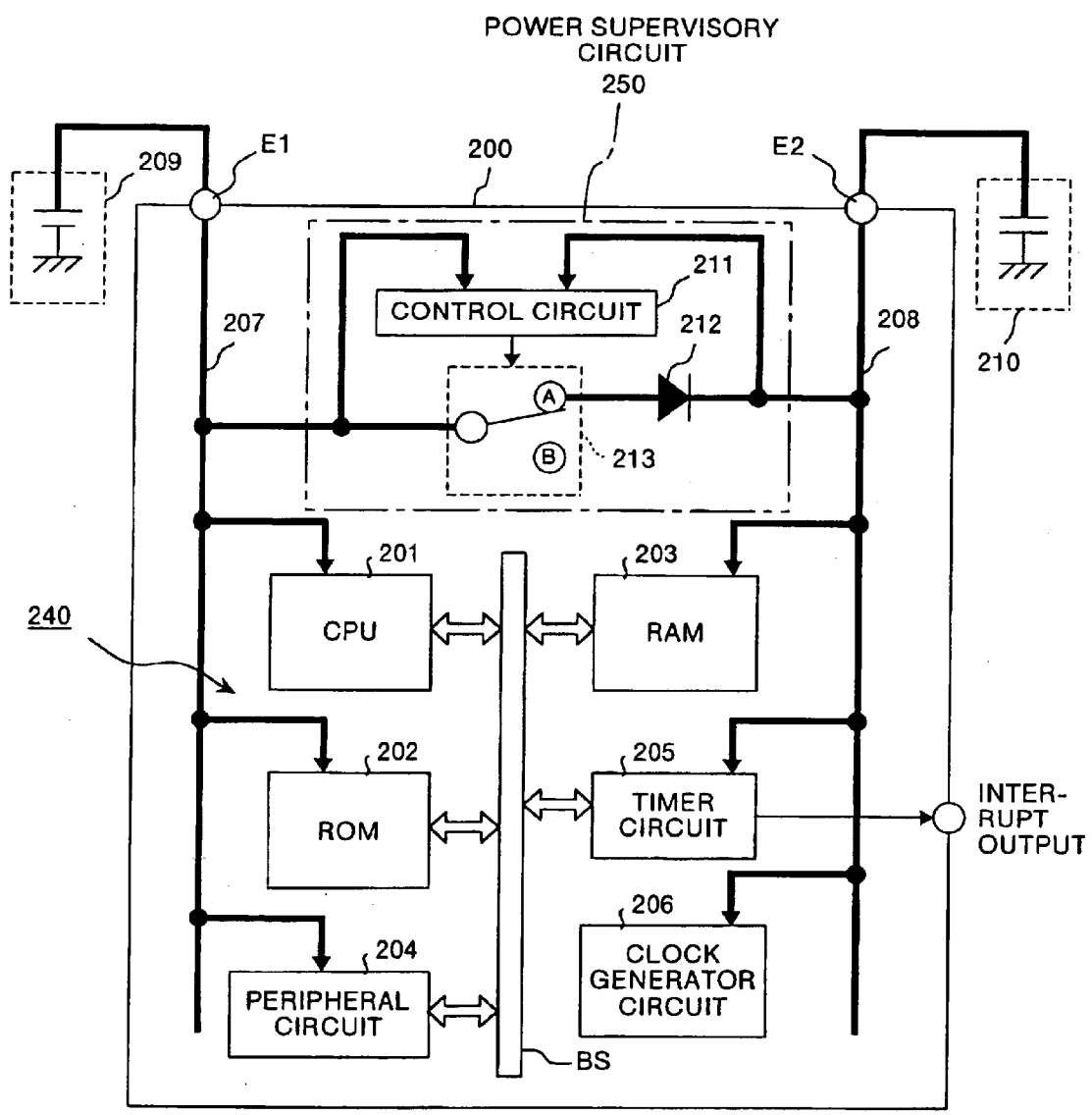
FIG. 1 is a block diagram showing a configuration of a semiconductor integrated circuit according to a first embodiment of the present invention.

FIG. 1 is a block diagram showing a configuration of a semiconductor integrated circuit according to a first embodiment of the present invention. This semiconductor integrated circuit 200 includes a micro-controller 240 and a power supervisory circuit 250. The micro-controller 240 includes the following electronic circuits and a bus BS connected with these electronic circuits. More specifically, the electronic circuits include a CPU 201, a ROM 202 and a RAM 203 for storing programs and data, a peripheral circuit 204 for performing a data input/output from an external device, a timer circuit 205 for counting a program operating time, and a clock generator circuit 206 for generating a system clock. An output of the timer circuit 205 is connected to an interrupt output terminal.

The power supervisory circuit 250 has a switch 213 comprising a MOS transistor or the like, a control circuit 211 and a diode 212.

The semiconductor integrated circuit 200 includes two power supply terminals (power supply pin), that is, a first power supply terminal E1 connected to an external main power supply (constant voltage source) 209, and a second power supply terminal E2 connected to an external backup capacitor (capacitor, backup power source) 210.

Some electronic circuits (in this case, CPU 201, ROM 202 and peripheral circuit 204) of the micro-controller 240 are connected to a first power supply line 207. The first power supply line 207 is connected to the external constant voltage source 209 via the first power supply terminal E1.

The remainder electronic circuits (in this case, RAM 203, timer circuit 205 and clock generator circuit 206) of the micro-controller 240 are connected to a second power supply line 208. The second power supply line 208 is connected to the external backup capacitor 210 via the second power supply terminal E2.

The power supervisory circuit 250 is supplied with a main power and backup power via the above first and second power supply terminals, and is driven using these supplied power. In the power supervisory circuit 250, the first and second power supply terminals E1 and E2 are connected to each other. The switch 213 performs switching for making a disconnection or connection between the first and second power supply terminals E1 and E2. Namely, the switch 213 makes the following operation; more specifically, when the switch 213 is connected to a terminal A-side, the first and second power supply terminals E1 and E2 are turned on via the diode 212. On the other hand, when the switch 213 is connected to a terminal B-side, disconnection is made between the first and second power supply terminals E1 and E2. The control circuit 211 supervises each potential of the first and second power supply terminals E1 and E2, and then, controls a changeover of the switch 213 based on the supervisory result.

The following is a description on an operation of the semiconductor integrated circuit. First, a constant voltage VDD is applied from the constant voltage source 209 to the first power supply line 207 via the first power supply terminal E1. In this case, a voltage of the second power supply line 208 is in a state of closing to 0V; therefore, the voltage of the second power supply line 208 becomes a state lower than that of the first power supply line 207. When this state is detected by the control circuit 211 of the power supervisory circuit 250, the control circuit 211 controls the switch 213 so that the switch 213 is connected to the terminal A-side. By doing so, a current flows into the second power supply line 208 from the first power supply line 207 via the diode 212; as a result, the voltage of the second power supply line 208 is stepped up to the voltage VDD of the first power supply line 207. Therefore, the power supply voltage VDD is applied to all electronic circuit of the micro-controller 240, that is, CPU 201, ROM 202, RAM 203, peripheral circuit 204, timer circuit 205 and clock generator circuit 206, so that a predetermined program can be executed by these electronic circuits 201 to 206.

Concurrently with the execution of program, an electric charge Q=C·VDD (C is a capacitance of the capacitor 210) is charged to the backup capacitor 210 via the second power supply terminal E2. In this state, an instantaneous blackout occurs, and the voltage supplied from the constant voltage source 209 becomes lower than the voltage VDD. For this reason, the CPU 201 and the ROM 202 fall into a non-operable state. In preparation for the case where the above accident happens, the control circuit of the power supervisory circuit 250 supervises each voltage of the first and second power supply lines 207 and 208. Further, the control circuit detects a main power failure (voltage drop) when the voltage of the first power supply line 207 becomes lower than a predetermined value or more as compared with the voltage of the second power supply line 208. When detecting detects the main power failure, the control circuit 211 transmits a system reset signal to the micro-controller 240, and stops the operation of the CPU 201, ROM 202 and peripheral circuit 204 connected to the first power supply line 207. Simultaneously, the control circuit 211 changes the switch 213 to the terminal B-side so as to make a disconnection between the first and second power supply terminals E1 and E2.

The second power supply line 208 is held to the voltage VDD by the function of the capacitor 210. Therefore, the RAM 203, timer circuit 205 and clock generator circuit 206 connected to the second power supply line 208 are operable. The potential of the second power supply line 208 drops due to the operation of the RAM 203, timer circuit 205 and clock generator circuit 206. However, in this case, a capacitance value of the backup capacitor 210 is set sufficiently higher, and thereby, it is possible to operate these the RAM 203, timer circuit 205 and clock generator circuit 206 for a predetermined time.

The semiconductor integrated circuit 200 is constructed as described above, and thereby, even in the case where the voltage VDD of the constant voltage source applied from the outside drops by an instantaneous voltage drop or the like, the second power supply line 208 side can hold the voltage VDD of the constant voltage source. Therefore, it is possible to hold a data stored in the RAM 203, and to operate the clock generator circuit 206 and the timer circuit 205 for a predetermined time. By doing so, for example, in the case where the voltage of the external power supply is recovered after it instantaneously drops, it is possible to restart the program operation using the data held in the RAM 203. Further, the timer circuit 205 counts the instantaneous voltage drop time, and if time fatal to program operation elapses, interrupt output operation is executed with respect to the outside.

As described above, in this first embodiment, two power supply terminals, that is, the first power supply terminal E1 for main power and the second power supply terminal E2 for back power are provided as power supply terminal independently from each other. When the main power supply 209 is normal, all electronic circuits included in the micro-controller 240 are driven by the main power supply 209, and when the main power supply 209 is failure, only some electronic circuits included in the micro-controller 240 are driven by the backup power supply (capacitance) 210. Therefore, the number of driving electronic circuits is reduced by the backup power supply (capacitance) 210, and further, power consumption in the backup operation can be reduced. As a result, without making large circuit scale, it is possible to greatly increase the backup operation time in main power failure such as instantaneous blackout and power disconnection, as compared with the conventional art of collectively providing a backup capacitor having a large capacity at the external power supply line.

In the first embodiment, three electronic circuits, that is, the RAM 203, timer circuit 205 and clock generator circuit 206 have been connected to the second power supply line 208. Only one or two of these three electronic circuits is connected to the second power supply line 208, and the remainder electronic circuits may be connected to the first power supply line 207. In this case, the number of electronic circuits connected to the second power supply line 208 is reduced, and thereby, it is possible to operate the electronic circuits connected to the second power supply line 208 for a longer time.

Further, the backup capacitor 210 may be a battery such as a dry battery, lithium ion battery, nickel-cadmium battery or the like. Even in the case where the backup capacitor 210 is a battery, the number of electronic circuits driven by the battery is reduced; therefore, it is possible to reduce power consumption in the backup operation, and to make long backup operation time.

Figure 2:
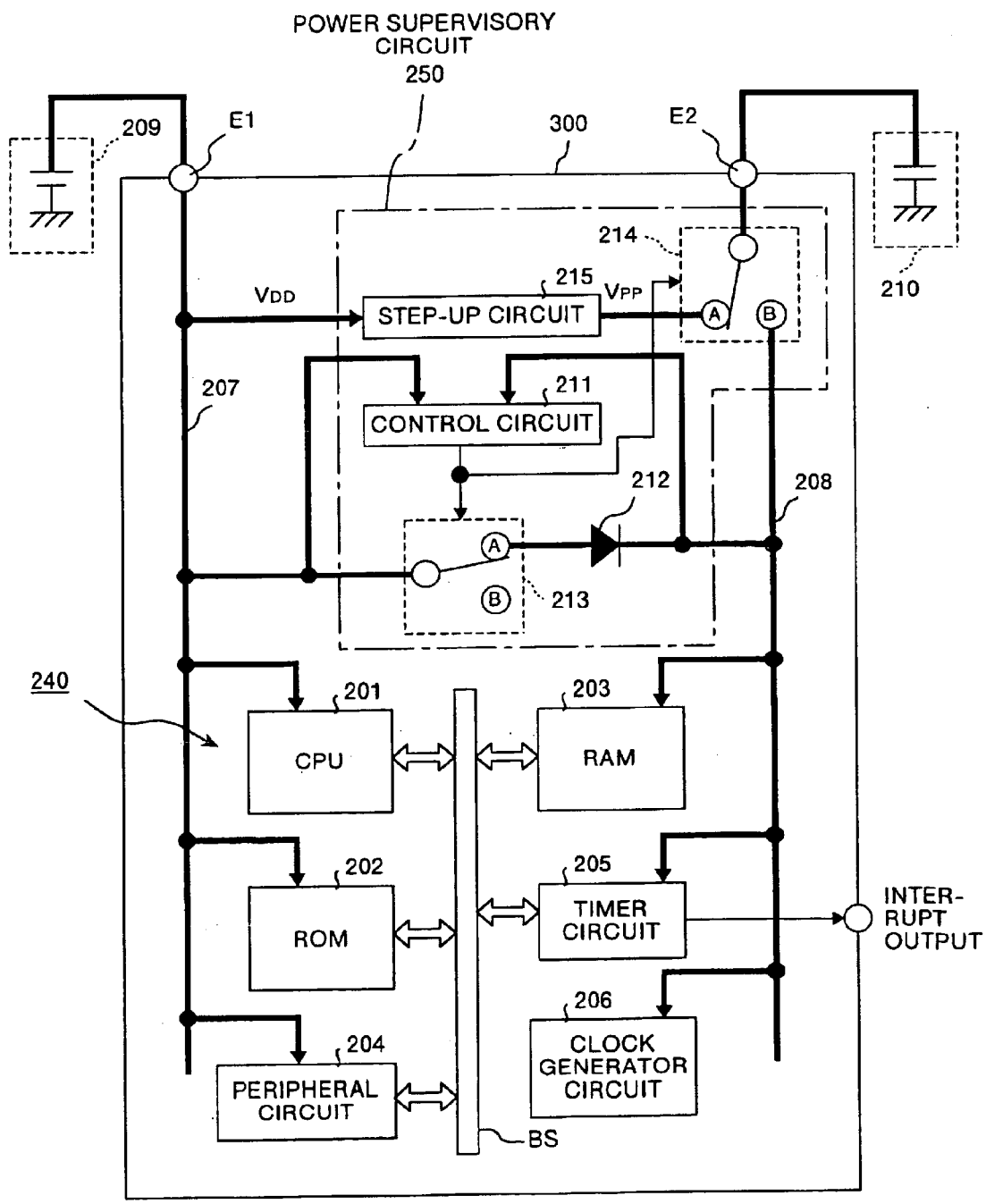
FIG. 2 is a block diagram showing a configuration of a semiconductor integrated circuit according to a second embodiment of the present invention.

FIG. 2 is a block diagram showing a configuration of a semiconductor integrated circuit 300 according to a second embodiment of the present invention. In FIG. 2, like reference numerals are used to designate constituent elements having the same function as those shown in FIG. 1, and the overlapping explanation is omitted.

In the semiconductor integrated circuit 300, the power supervisory circuit 250 is constructed in a manner that the first and second power supply terminals E1 and E2 are connected via a voltage step-up circuit 215 and a switch 214.

The voltage step-up circuit 215 steps up the voltage VDD of the first power supply line 207 so as to generate a voltage Vpp higher than the voltage VDD. The switch 214 comprises a MOS transistor or the like, and makes a changeover for connecting the second power supply terminal E2 to any of the voltage step-up circuit 215 and the second power supply line 208. Therefore, the backup capacitor 210 is connected to the second power supply line 208 or to an output Vpp of the voltage step-up circuit 215 via the switch 214. Further, a changeover of the switch 214 is controlled by the control circuit 211. The switch 213 and the diode 212 are interposed between the first and second power supply lines 207 and 208.

The following is a description on an operation of the semiconductor integrated circuit 300. First, when the constant voltage VDD is applied from the constant voltage source 209 to the first power supply line 207, the switches 213 and 214 are connected to the terminal A-side by the control circuit 211 of the power supervisory circuit 250. At that time, the voltage VDD is applied to the second power supply line 208 via the switch 213 and the diode 212; therefore, the power supply voltage VDD is applied to all electronic circuits of the micro-controller 240, that is, CPU 201, ROM 202, RAM 203, peripheral circuit 204, timer circuit 205 and clock generator circuit 206. Accordingly, a predetermined program is executed by these electronic circuits 201 to 206.

Simultaneously, the output Vpp of the voltage step-up circuit 215 is connected to the backup capacitor 210 via the switch 214 and the second power supply terminal E2; therefore, the backup capacitor 210 is charged by the stepped-up voltage Vpp. More specifically, the backup capacitor 210 is changed a charge Q=C·Vpp (C is a capacitance of the capacitor 210).

In this state, by the instantaneous blackout described before, the voltage supplied from the constant voltage source 209 becomes lower than the voltage VDD; for this reason, the CPU 201 and the ROM 202 fall into a non-operable state. Likewise, the control circuit 211 of the power supervisory circuit 250 detects this state as a main power failure. Thereafter, the control circuit 211 transmits a system reset signal to the micro-controller 240, and stops the operation of the CPU 201, ROM 202 and peripheral circuit 204 connected to the first power supply line 207 while changing the switches 213 and 214 to the terminal B-side. As a result, a disconnection is made between the first and second power supply lines 207 and 208, and the backup capacitor 210 is connected to the second power supply line 208 side.

Thus, a charge from the backup capacitor 210 is supplied to the second power supply line 208. The charge supplied to the second power supply line 208 is charged by a step-up voltage; therefore, the RAM 203, timer circuit 205 and clock generator circuit 206 connected to the second power supply line 208 are operable for a longer time as compared with the above first embodiment.

As described above, in this second embodiment, the backup capacitor is charged by the voltage stepped up by the voltage step-up circuit 215. Therefore, it is possible to increase a charge stored in the backup capacitor, and to sufficiently secure a charge supplied from the backup capacitor in a backup operation. Further, the output of the voltage step-up circuit 215 is used only for charging the backup capacitor 210, and is not used for operating the electronic circuits included in the semiconductor integrated circuit. Therefore, it is possible to make small the circuit scale.

In this second embodiment, the switch 214 may be composed of a switching element having a threshold voltage Vth (V) such as NMOS gate, and thereby, the second power supply line side potential of the second switch 214 may be set lower by the threshold voltage as compared with the second power supply terminal side potential Vpp (Vpp−Vth). The potential (Vpp−Vth) is set so as to become approximately same as the main power VDD, and thereby, the potential of the stepped up backup capacitor 210 is stepped down to the potential Vpp of the main power supply 209 by the second switch 214. Thus, the potential is applied to the RAM 203, timer circuit 205 and clock generator circuit 206 connected to the second power supply line 208. By doing so, it is possible to operate the electronic circuits connected to the second power supply line 208 for a longer time, and to stably operate the electronic circuits driven in the backup operation at a suitable voltage.

Figure 3:
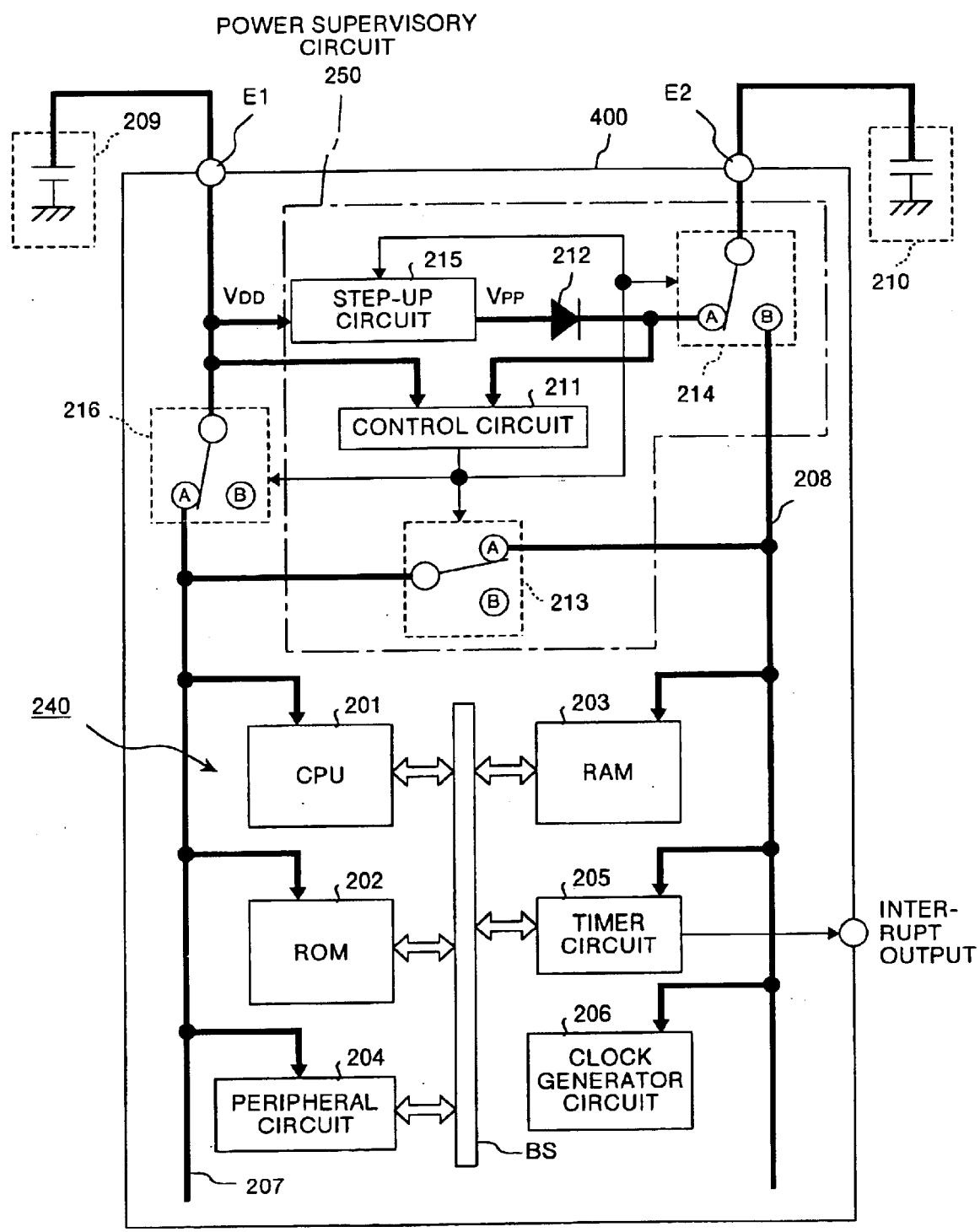
FIG. 3 is a block diagram showing a configuration of a semiconductor integrated circuit according to a third embodiment of the present invention.
Figure 4:
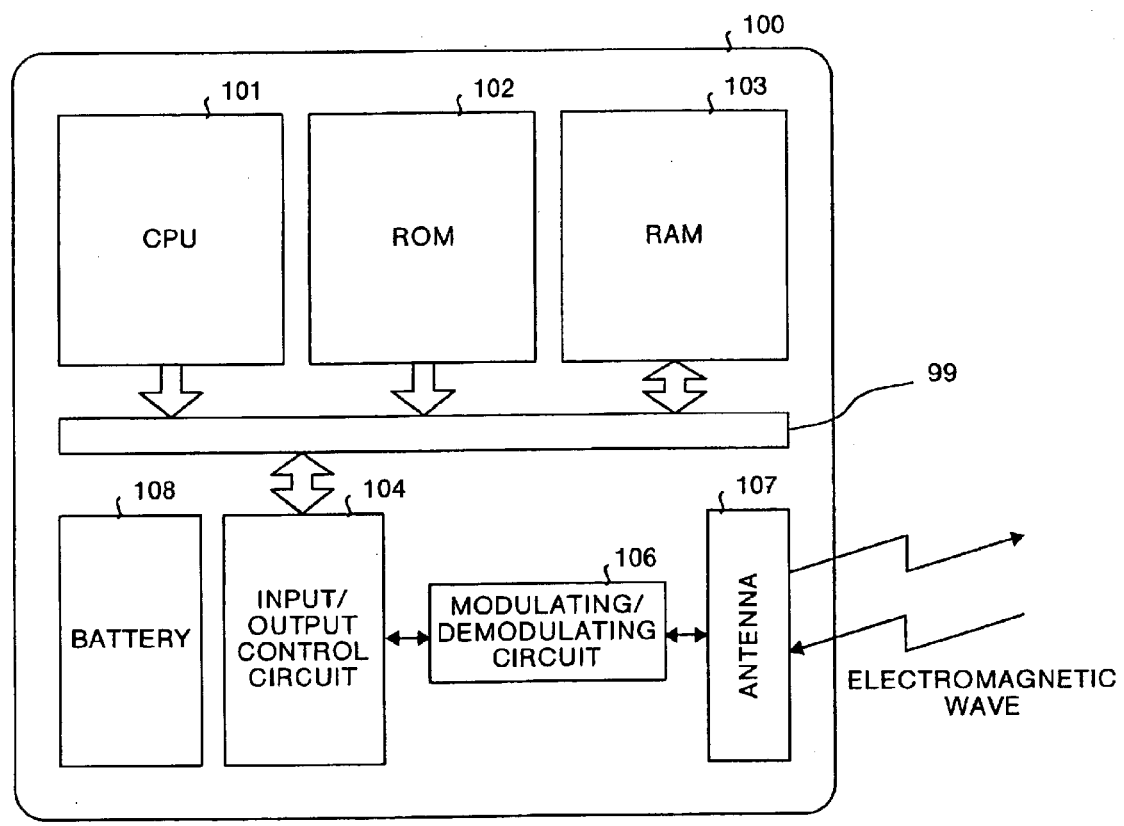
FIG. 4 is a circuit block diagram showing a conventional art.
Figure 5:
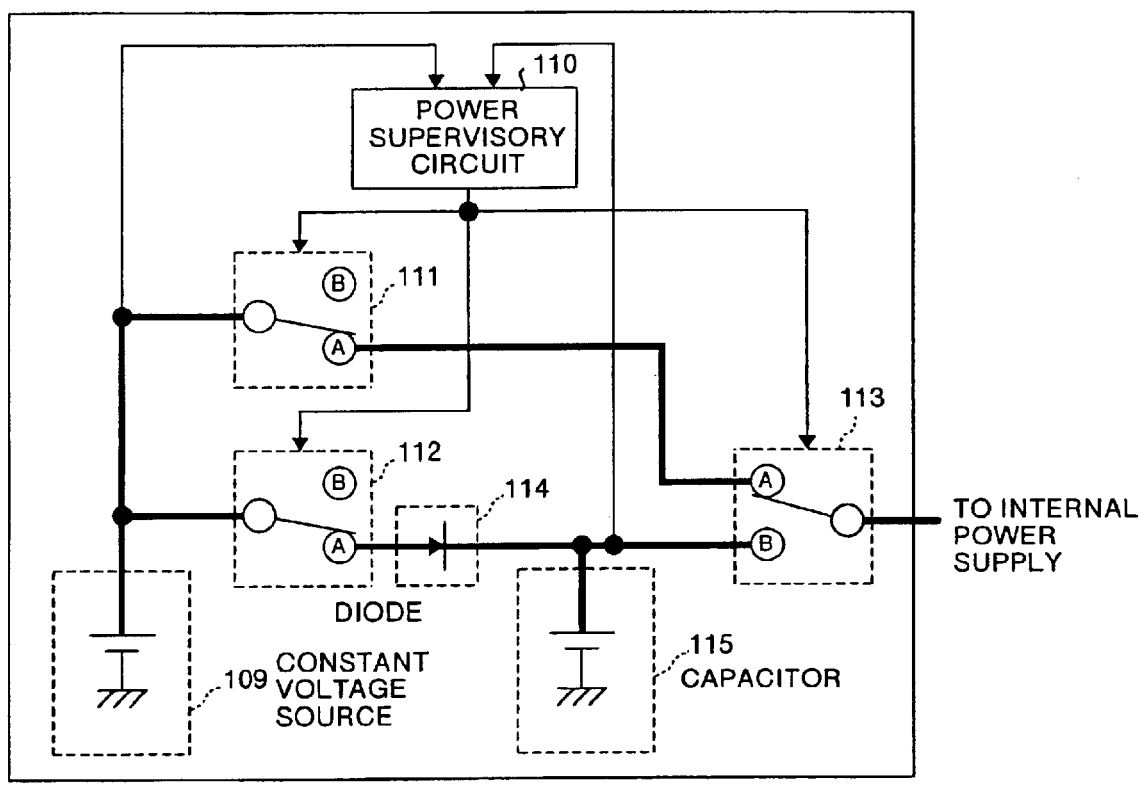
FIG. 5 is a block diagram showing an internal configuration of battery in the conventional art.

FIG. 3 is a block diagram showing a configuration of a semiconductor integrated circuit 400 according to a third embodiment of the present invention. In FIG. 3, like reference numerals are used to designate constituent elements having the same function as those shown in FIG. 1 and FIG. 2, and the overlapping explanation is omitted.

In the semiconductor integrated circuit 400, a switch 216 is newly added to the power supervisory circuit 250. The switch 216 is composed of a MOS transistor or the like, and performs a switching operation of disconnection or connection between the first power supply terminal E1 and the first power supply line 207. Further, the voltage VDD of the first power supply line 207 and the output voltage Vpp of the voltage step-up circuit are input into the control circuit 211 of the power supervisory circuit 250, and thus, the control circuit 211 makes a comparison between these voltages so as to detect a main power failure. In this third embodiment, the diode 212 is provided on the output side of the voltage step-up circuit 215.

The following is a description on an operation of the semiconductor integrated circuit 400. First, using the configuration of this third embodiment, the substantially same operation as the above second embodiment is made. That is, when the constant voltage VDD is applied from the constant voltage source 209 to the first power supply line 207, the switches 213, 214 and 216 are connected to the terminal A-side by the control circuit 211 of the power supervisory circuit 250. At that time, the voltage VDD is applied to the second power supply line 208 via the switches 216 and 213; therefore, the power supply voltage VDD is applied to all electronic circuits of the micro-controller 240, that is, CPU 201, ROM 202, RAM 203, peripheral circuit 204, timer circuit 205 and clock generator circuit 206. Accordingly, a predetermined program is executed by these electronic circuits 201 to 206.

Simultaneously, the output Vpp of the voltage step-up circuit 215 is connected to the backup capacitor 210 via the diode 212, the switch 214 and the second power supply terminal E2; therefore, the backup capacitor 210 is charged by the stepped-up voltage Vpp. More specifically, the backup capacitor 210 is charged a charge Q=C·Vpp (C is a capacitance of the capacitor 210).

In this state, by the instantaneous blackout described before, the voltage supplied from the constant voltage source 209 becomes lower than the voltage VDD; for this reason, the CPU 201 and the ROM 202 fall into a non-operable state. Likewise, the control circuit 211 of the power supervisory circuit 250 detects this state as a main power failure. Thereafter, the control circuit 211 transmits a system reset signal to the micro-controller 240, and stops the operation of the CPU 201, ROM 202 and peripheral circuit 204 connected to the first power supply line 207 while changing the switches 213 and 214 to the terminal B-side. The switch 216 is held to the terminal A-side. As a result, a disconnection is made between the first and second power supply lines 207 and 208, and the backup capacitor 210 is connected to the second power supply line 208 side.

Thus, a charge from the backup capacitor 210 is supplied to the second power supply line 208. The charge supplied to the second power supply line 208 is charged by a step-up voltage; therefore, the RAM 203, timer circuit 205 and clock generator circuit 206 connected to the second power supply line 208 are operable for a longer time as compared with the above first embodiment.

Subsequently, the following is a description on another operation by the configuration of this third embodiment when main power failure is detected. According to the above operation, when the control circuit 211 of the power supervisory circuit 250 makes a detection that a potential supplied to the constant voltage source 209 is lower than the voltage VDD, the control circuit 211 connect only switch 213 to the terminal A-side while connecting the switches 214 and 216 to the terminal B-side. By doing so, the first power supply line 207 is separated from the first power supply terminal E1 of the main power source 209 side so that not only second power supply line 208 but also first power supply line 207 can be connected to the backup capacitor 210. Therefore, in this case, in the backup operation, all electronic circuits 201 to 206 of the micro-controller 240 can be driven by the backup capacitor 210.

In this third embodiment, the switch 214 maybe composed of a switching element having a threshold voltage Vth (V) such as NMOS gate, and thereby, the second power supply line side potential of the second switch 214 may be set lower by the threshold voltage as compared with the second power supply terminal side potential Vpp (Vpp−Vth). The potential (Vpp−Vth) is set so as to become approximately same as the main power VDD, and thereby, the potential of the stepped up backup capacitor 210 is stepped down to the potential Vpp of the main power supply 209 by the second switch 214. Thus, the potential is applied to the RAM 203, timer circuit 205 and clock generator circuit 206 connected to the second power supply line 208, and further, to the CPU 201, ROM 202 and peripheral circuit 204 connected to the first power supply line 207. By doing so, it is possible to operate the electronic circuits connected to the second power supply line 208 for a longer time, and to stably operate the electronic circuits driven in the backup operation at a suitable voltage.

Further, in this third embodiment, the switches 213, 214 and 216 maybe composed of an enhancement-mode transistor, and threshold voltages Vth1, Vth2 and Vth3 are independently set to these switches 213, 216 and 214, respectively, and thereby, it is possible to control a voltage value applied to the first and second power supply lines 207 and 208. For example, the switches 213 and 216 are composed of a switching element having a threshold voltage 0V such as CMOS gate, and the switch 214 is composed of a switching element having a threshold voltage Vth (V) such as NMOS gate. In this case, Vth1=0, Vth2=0, and Vth3=Vth. According to the above switch configuration, the potential of the second power supply line 208 side of the switch 214 is Vpp−Vth. Therefore, it is possible to make lower a voltage applied from the backup capacitor 210 to the first and second power supply lines 207 and 208 than the potential Vpp of the backup capacitor 210.

In general, when a voltage higher than the standards is applied to the electronic circuits, the operation becomes unstable, or the device lifetime becomes short; as a result, there are many cases where an operation guaranteed period becomes short. On the contrary, in the semiconductor integrated circuit, the threshold voltages Vth1, Vth2 and Vth3 of the switches 213, 216 and 214 are individually adjusted. By doing so, it is possible to operate the electronic circuits 201 to 206 of the semiconductor integrated circuit 400 at a voltage lower than the voltage VDD or Vpp supplied from the main power source 209 or backup capacitor 210. Accordingly, it is possible to stably operate these electronic circuits 201 to 206, and to guarantee a longer operation time.

In the above preferred embodiments, in order to reduce the number of pins, the backup capacitor 210 may be made into a MCM (multi-chip module) so that it is not exposed outside as the external pin E2 of the semiconductor integrated circuit 200, 300, and 400.

As is evident from the above description, according to the present invention, the number of electronic circuits driven by the backup power source is reduced, so that power consumption in the backup operation can be reduced. Therefore, without making large the circuit scale, it is possible to greatly make long a backup operation time in the main power failure such as instantaneous blackout and power disconnection, as compared with the conventional case.

Further, according to the present invention, it is possible to reduce the number of pins. Moreover, it is possible to securely detect a voltage drop of main power source such as instantaneous blackout or the like. Furthermore, it is possible to operate the electronic circuits connected to the second power supply line for a longer time.

Further, it is possible to make small the circuit scale. Moreover, it is possible to operate the electronic circuits connected to the second power supply line for a longer time, and to stably operate the electronic circuits operated in the backup at a suitable voltage. Furthermore, it is possible to protect the storage contents of memory even in the case of blackout or the like. In addition, the electronic circuit driven in the backup is only memory; therefore, it is possible to make long a backup operation time.

Further, it is possible to count a clock data. In addition, the electronic circuit driven in the backup is only clock generator circuit and timer circuit; therefore, it is possible to make long a backup operation time. Moreover, it is possible to protect the storage contents of memory and to count a clock data. In addition, the electronic circuit driven in the backup is only memory, clock generator circuit and timer circuit; therefore, it is possible to make long a backup operation time.

Further, it is possible to drive the electronic circuits included in the micro-controller by the main power source or the backup capacitor. Moreover, it is possible to operate the electronic circuits included in the micro-controller for a longer time.

Further, it is possible to operate the electronic circuits connected to the second power supply line for a longer time, and to stably operate the electronic circuits operated in the backup at a suitable voltage. Moreover, it is possible to operate each electronic circuit of the semiconductor integrated circuit at a voltage lower than the voltage supplied from the main power source or backup capacitor, and to securely and stably operate the electronic circuits of the micro-controller at a suitable voltage for a long time.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A semiconductor integrated circuit comprising:
a micro-controller havina at least two electronic circuits;
a power supervisory circuit for supervising power supply voltage of an externally located main power source and a backup power source;
a first power supply terminal connected to the main power source;
a second power supply terminal connected to the backup power source;
a first power supply line connecting a first electronic circuit of said micro-controller and said first power supply terminal; and
a second power supply line connecting a second electronic circuit of said micro-controller and said second power supply terminal, wherein said power supervisory circuit is supplied with main power from the main power source through said first power supply terminal, and supplied with backup power from the backup power source through said second power supply terminal, and said power supervisory circuit includes a first switch connecting said first and second power supply terminals to each other and disconnecting said first and second power supply terminals from each other; and
a control circuit which monitors the main power source and controls said first switch, wherein,
when the main power source is normal, said control circuit controls said first switch so that the first and second electronic circuits are driven by power from the main power source, and
when the main power source has a failure, said control circuit controls said first switch so that the second electronic circuit is driven by power from the backup power source, and
said control circuit monitors a difference between voltages at said first and second power supply terminals, and determines that the main power source has a failure when the difference is larger than a threshold value.

2. The semiconductor integrated circuit according to claim 1, wherein said power supervisory circuit includes a voltage step-up circuit which steps up the voltage of the main power source applied to said first power supply terminal, and supplies the voltage stepped up to said second power supply terminal.

3. The semiconductor integrated circuit according to claim 2, wherein said power supervisory circuit includes a second switch that connects and disconnects said second power supply terminal with said voltage step-up circuit and said second power supply line, wherein said control circuit controls said second switch so that said second power supply terminal is connected to said voltage step-up circuit so that a capacitor is charged by said main power source when the main power source is normal, and controls said second switch so that said second power supply terminal is connected to said second power supply line when the main power source has a failure.

4. The semiconductor integrated circuit according to claim 3, wherein a potential of said second switch on said second power supply line is lower than a potential on said second power supply terminal by a threshold value.

5. The semiconductor integrated circuit according to claim 1, wherein said second electronic circuit is a memory.

6. The semiconductor integrated circuit according to claim 1, wherein said second electronic circuit includes a clock generator circuit and a timer circuit.

7. The semiconductor integrated circuit according to claim 1, wherein said second electronic circuit includes a memory, a clock generator circuit, and a timer circuit.

8. A semiconductor integrated circuit comprising:
a micro-controller having at least two electronic circuits;
a power supervisory circuit for supervising power supply voltage of an externally located main power source and a backup power source;
a first power supply terminal connected to the main power source;
a second power supply terminal connected to the backup power source;
a first power supply line connecting a first electronic circuit of said micro-controller and said first power supply terminal; and
a second power supply line connecting a second electronic circuit of said micro-controller and said second power supply terminal, wherein said power supervisory circuit is supplied with main power from the main power source through said first power supply terminal, and supplied with backup power from the backup power source through said second power supply terminal, and said power supervisory circuit includes a first switch connecting said first and second power supply terminals to each other, and disconnecting said first and second power supply terminals from each other, and the backup power source connected to said second power supply terminal includes a capacitor charged by the main power source when said first and second power supply terminals are connected to each other through said first switch; and
a control circuit which monitors the main power source and controls the first switch, wherein,
when the main power source is normal, said control circuit controls said first switch so that the first and second electronic circuits are driven by power from the main power source, and
when the main power source has a failure, said control circuit controls said first switch so that the second electronic circuit is driven by power from the backup power source, and
said power supervisory circuit includes a voltage step-up circuit which steps up the voltage of the main power source applied to said first power supply terminal, and supplies the voltage stepped up to said second power supply terminal.

9. The semiconductor integrated circuit according to claim 8, wherein said power supervisory circuit includes a second switch that connects and disconnects said second power supply terminal with said voltage step-up circuit and said second power supply line, wherein said control circuit controls said second switch so that said second power supply terminal is connected to said voltage step-up circuit so that said capacitor is charged by said main power source when the main power source is normal, and controls said second switch so that said second power supply terminal is connected to said second power supply line when the main power source has a failure.

10. The semiconductor integrated circuit according to claim 9, wherein a potential of said second switch on said second power supply line is lower than a potential on said second power supply terminal by a threshold value.

11. The semiconductor integrated circuit according to claim 8, wherein said second electronic circuit is a memory.

12. The semiconductor integrated circuit according to claim 8, wherein said second electronic circuit includes a clock generator circuit and a timer circuit.

13. The semiconductor integrated circuit according to claim 8, wherein said second electronic circuit includes a memory, a clock generator circuit and a timer circuit.

14. A semiconductor integrated circuit comprising:

a micro-controller having at least two electronic circuits;

a power supervisory circuit for supervising a power supply voltage of an externally located main power source and a backup capacitor;

a first power supply terminal connected to the main power source;

a second power supply terminal connected to the backup capacitor;

a first power supply line connecting a first electronic circuit of said micro-controller and said first power supply terminal; and a second power supply line connecting a second electronic circuit of said micro-controller and said second power supply terminal, wherein said power supervisory circuit is supplied with main power from the main power source through said first power supply terminal, and supplied with backup power from the backup capacitor through said second power supply terminal, and said power supervisory circuit includes, a first switch that connects and disconnects said first and second power supply lines with each other;

a second switch that alternately connects said second power supply terminal to (i) said first power supply terminal and (ii) said second power supply line;

a third switch that connects and disconnects said first power supply terminal and said first power supply line with each other; and a control circuit which monitors the main power source, and controls said first, second, and third switches, wherein, when said main power source is normal, said control circuit controls said first and third switches so that the first and second electronic circuits are driven by power from the main power source, and controls said second switch so that said second power supply terminal is connected to said first power supply terminal, thereby driving the first and second electronic circuits with power from the main power source, and, when said main power source has a failure, said control circuit controls said first switch so that said first and second power supply lines are connected with each other, controls said second switch so that said second power supply terminal is connected to said second power supply line, and controls said third switch so that connection between said first power supply terminal and said first power supply line is not established, thereby driving the first and second electronic circuits with power from the backup capacitor.

15. The semiconductor integrated circuit according to claim 14, wherein said power supervisory circuit includes a voltage step-up circuit, which steps up a voltage of the main power source applied to said first power supply terminal so that said voltage step-up output is connected to said first power supply terminal of said second switch.

16. The semiconductor integrated circuit according to claim 15, wherein a potential of said second switch on said second power supply line is lower than a potential on said second power supply terminal by a threshold value.

17. The semiconductor integrated circuit according to claim 15, wherein said first, second, and third switches comprise enhancement-mode transistors, and threshold voltages of said first, second, and third switches are different.

* * * * *